Patented Dec. 8, 1942

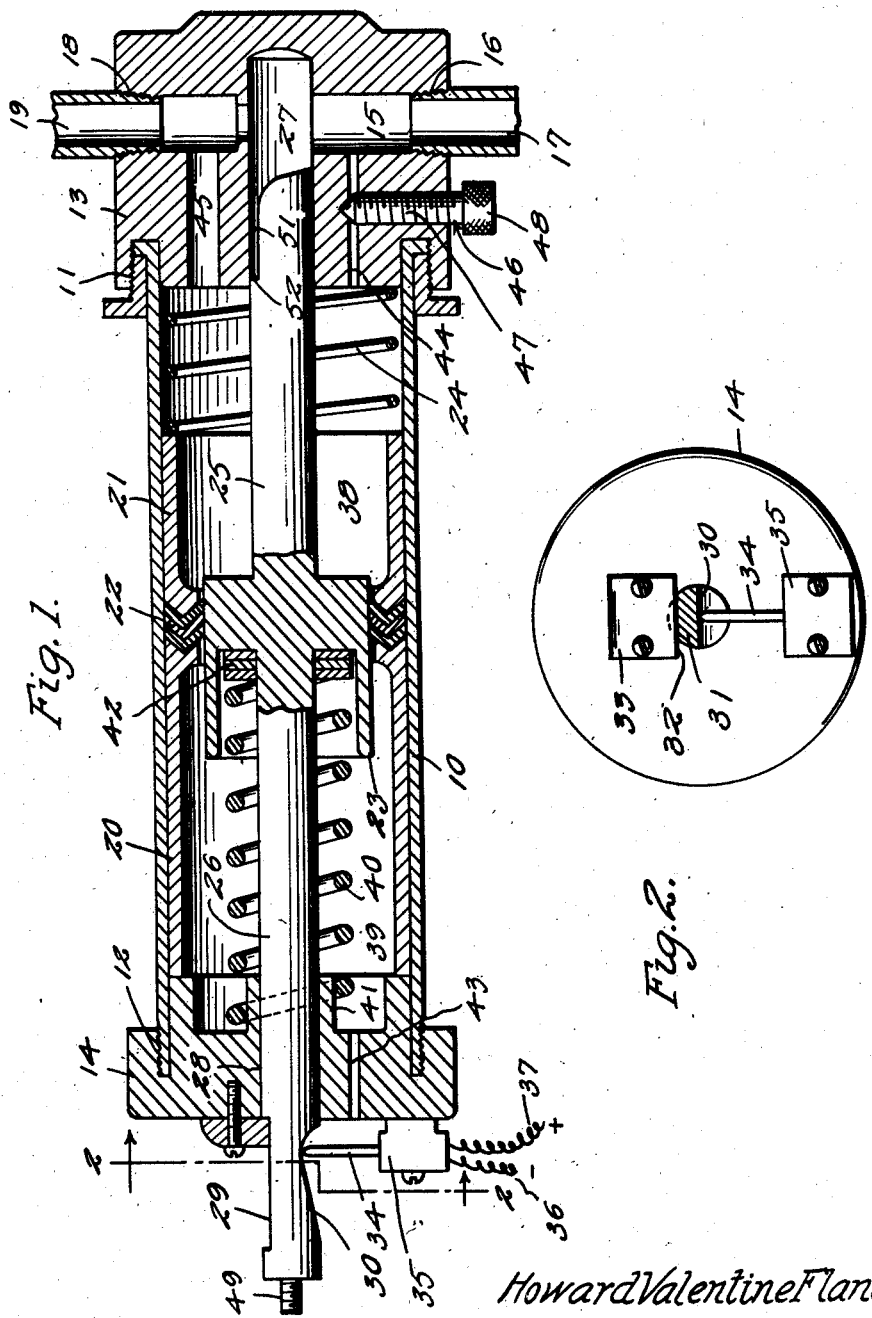

2,304,404

UNITED STATES PATENT OFFICE 2,304,404

AUTOMATIC PRESSURE LOSS CUTOFF VALVE

Howard V. Flanagan, Palms, Calif.

Application May 22, 1941, Serial No. 394,707

2 Claims. (Cl. 137—153)

My invention relates to new and useful improvements in fluid control valves.

An important object of my invention is the provision of an improved fluid control valve of the type adapted to be placed in pipe lines through which a fluid under pressure passes, which valve will be normally closed to prevent the fluid from flowing through the pipe line but, when once adjusted, will open to permit the fluid to flow through the line and will remain in the open position until the fluid pressure in the line is materially reduced, at which time the valve will be automatically returned to ts normally closed position to prevent further flow of the fluid.

Another object of my invention is the provision of a fluid control valve of the above-mentioned character that is uniquely constructed to be automatically responsive to pressure variations in the pipe line, the valve being of essentially simple and substantial construction to obviate, as much as possible, its susceptibility to mechanical troubles.

Still another object of my invention is the provision of a fluid control vaive of the above-mentioned character that is inexpensive to manufacture and efficient and efficacious in the performance of its duties.

Other objects and advantages of my invention will be apparent during the course of the following description.

In the drawing, forming a part of this specification, and wherein like numerals are employed to designate like parts throughout the same:

Figure 1 is a longitudinal sectional view of a valve embodying my invention and showing the same incorporated in a pipe line, and Figure 2 is a transverse sectional view taken on the line 2—2 of Figure 1.

In the accompanying drawing, wherein for the purpose of illustration, is shown a preferred embodiment of my invention, the numeral 10 designates a valve body of tubular formation having its opposite ends screw-threaded, as at 11 and 12, to receive the heads 13 and 14. A fluid passage 15 extends diametrically through the head 13, the end 16 of the passage being screw-threaded to receive the fluid discharged by the pipe 17 and the end 18 thereof being screw-threaded to receive the fluid outlet pipe 19. The pipes 17 and 19 comprise parts of a pipe line, for instance, gas pipes through which the fluid under pressure passes. The valve is placed in the pipe line and is adapted to prevent passage of the fluid therethrough in the event that there is a drop of pressure therein. It is to be understood, however, that the line may carry any fluid medium such as oil, steam, air or similar gases.

The sleeves 20 and 21 are snugly fitted in the valve body and the abutting ends thereof clampingly engage the hydraulic seal rings 22, the inner edges of which rings frictionally engage the peripheral wall of the piston 23. The sleeve 20 is preferably immovably associated with the valve body and the sleeve 21 is preferably slidable therein but normally urged in the direction of the stationary sleeve by the coil spring 24, one end of which seats against the outer end of the sleeve 21 and the opposite end of which seats against the confronting face of the head 13.

The piston 23 is provided with oppositely directed shanks 25 and 26 which extend axially through the valve body. The shank 25 is slidably received within a passage 27 in the head 13 which extends axially of the head and transversely through the fluid passage 15. The outer end of the passage 27 extends beyond the passage 15 but terminates short of the outer surface of the head and the inner end thereof opens through the inner face of the head. The shank 26 extends through a bore 28 provided centrally in the head 14 and the portion thereof extending beyond the head is formed at opposite sides thereof with recesses 29 and 30. The recess 29 has a flat longitudinal face 31 which engages the edge 32 of a guide block 33 carried by the head 14. The guide block prevents the piston from rotating within the valve body and effectively limits the reciprocative movements of the piston therein. The longitudinal face of the recess 30 is arcuately curved to provide a cam face for the actuator rod 34 of the switch 35. The switch is mounted on the head 14 and the electrical conductors 36 and 37 connect therewith and with a suitable indicator (not shown) for registering the position of the piston within the valve.

It may thus be seen that the piston is located at substantially the middle of the valve body and that the frictional engagement thereof with the seal rings 22 will divide the valve into separate chambers 38 and 39. A coil spring 40 surrounds the portion of the shank 26 extending through the chamber 39, one end of the spring being fitted over a boss 41 projecting from the inner face of the head 14 and the opposite end thereof being seated against the confronting face of the piston 23. If desired, a plurality of adjustment shims 42 may be interposed between the spring and the piston to provide an effective means for adjusting the tension of the spring.

Air and such gases as may blow by the seal rings 22 are permitted to bleed from the chamber 39 through the passage 43 which communicates with the atmosphere to prevent a back pressure from being developed within the chamber when the piston is moved in the direction of the head 14.

When there is no fluid pressure in the passage 15, the coil spring 40 will react against the piston to urge the shank 25 thereof into the end of the passage 27. When the shank is thus disposed in the passage it will obturate communication between the inlet and outlet pipes 17 and 19 and will, consequently, prevent the fluid received by the pipe 17 from the accumulator or other source of fluid pressure from having access to the discharge pipe 19. However, in order that the piston may be responsive to changes of fluid pressure in the passage 15, I have provided by-passes 44 and 45. The by-passes are located at opposite sides of the central passage 27 whereby the by-pass 44 will effect communication between the inlet side of the fluid passage 15 and chamber 38 and whereby the by-pass 45 will effect communication between the outlet side of the fluid passage 15 and the chamber 38. The flow of fluid through the inlet by-pass 44 is controlled by means of a needle valve 46, the shank 47 of the valve being screw-threaded and the outer end thereof being formed with a knurled head 48. The needle valve is adapted for manual actuation and when the same is threaded into the by-pass 44 it will prevent fluid in the fluid passage from having egress into the chamber 38; and, conversely, when the needle valve is retracted, it will permit the fluid in the passage to flow into the chamber.

If there is little or no pressure in the pipe line in which the control valve is placed, the coil spring 40 will actuate the piston to slide the shank 25 into obturating relation with the fluid passage 15. If, in addition, the needle valve 46 is in the advanced position to close the inlet by-pass 44, the piston will remain in the above position to prevent the fluid from flowing through the pipe line, and this is true even though fluid under pressure is thereafter permitted to enter the inlet side of the fluid passage 15. If it is desired to permit the pressure fluid to flow through the valve, it is necessary to retract the needle valve 46 a sufficient distance to open the inlet by-pass 44. The pressure fluid may then flow through the inlet by-pass and into the chamber 38 where it will react against the piston 23 and drive the same in the direction of the head 14 to compress the coil spring 40. Actuation of the piston in the above manner will retract the shank 25 and open communication between the inlet and outlet pipes 17 and 19. The spring 40 may be adjusted to yield to a selected fluid pressure in the passage by removing or adding the shims 42 and the air or fluid in chamber 39 may egress through the passage 43. After the inlet by-pass 44 has been opened to permit the pressure fluid to actuate the piston, the needle valve may be moved to the advanced position to close the inlet by-pass by reason of the fact that the fluid may still have access to chamber 38 through the outlet by-pass 45. Thus the fluid under pressure may flow through the pipe line and also enter the chamber 38 through the by-pass 45 to retain the piston in the last-mentioned position.

If a break should occur in the pipe line to produce a reduction of pressure therein or to produce such abnormal fluctuations in pressure as to permit the coil spring 40 to move the piston, the shank 25 will close the fluid passage 15. It will be readily apparent that the fluid in the chamber 38 may egress into the outlet pipe 19 when the piston is actuated by the spring 40. Thus, when the system is filled, the fluid will continue to flow as long as the pressure is sufficient to keep the spring 40 compressed. However, as soon as a break occurs in the fluid line, the spring will actuate the piston to close the fluid passage and thus conserve the fluid in the rest of the system. Once the valve is closed it will remain in this position until the needle valve 46 is again retracted to permit fluid of requisite pressure to enter the chamber 38. When the piston is positioned to close the fluid passage, the switch 35 will register the fact on a suitable indicator.

If it is desired to render the valve inoperative so that it will remain open regardless of the pressure in the pipe line, a suitable retaining means may be attached to the threaded shank 49 provided at the distal end of the piston shank 26. The piston is manually moved against the resilient action of the spring 40 and when the retaining means is attached to the shank 49, the piston will be held in this position to at all times permit free communication between the inlet and outlet ends of the fluid passage 15.

Attention is directed to the fact that the side of the shank facing the outlet pipe is cut away to provide a passage 51. If the shank is in a position to prevent fluid from flowing from the inlet pipe 17 to the outlet pipe, and a back pressure is developed in the outlet pipe 19 by the pumping station with which the pipe is in communication, the pressure will have access to the end of the shank and to the relatively small transverse wall 52 to drive the piston 23 in a direction to open the passage 15. Obviously, the unique formation of the piston shank will prevent the reverse of this operation, i. e., a pressure within the inlet pipe 17 may not act against the shank to move the same out of obturating relation with the passage. This unique mode of operation is particularly advantageous in a situation where the valve is remotely located, it being merely necessary to create a back pressure in the outlet pipe 19, after the rupture in the line has been found and repaired to effect an automatic opening of the line in which the valve is located.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. In a cut-off device, a casing, a head at one end of the casing having a fluid passage therethrough transverse to the axis of the casing and having an axially disposed bore intersecting the intermediate portion of the fluid passage, a piston mounted to reciprocate axially through the casing and slidably engaging packing disposed about the intermediate portion of the casing, the said piston and packing dividing the interior of the casing into inner and outer chambers, the said passage containing head having a pair of bores disposed at each side of the center bore to form by-pass connections between the inlet and outlet ends of the passage and the inner chamber of the casing, a shank extending from the inner side of the piston through the inner chamber and into the bore in the center portion of the passage containing head of the casing, a guide shank extending from the outer side of the piston and through the opposite head of the casing, a spring mounted in the outer chamber bearing against the piston for yieldingly urging the same to dispose the outer end of the inner shank in position to close the fluid passage, and a manually operable valve member movable to close the by-pass bore between the inlet end of the fluid passage and the inner chamber of the casing.

2. In a cut-off device, a casing, a head at one end of the casing having a fluid passage therethrough transverse to the axis of the casing and having an axially disposed bore intersecting the intermediate portions of the fluid passage, a piston mounted to reciprocate axially through the casing and slidably engaging packing disposed about the intermediate portion of the casing, the said piston and packing dividing the interior of the casing into inner and outer chambers, the said passage containing head having a pair of bores disposed at each side of the center bore to form by-pass connections between the inlet and outlet ends of the passage and the inner chamber of the casing, a shank extending from the inner side of the piston through the inner chamber and into the bore in the center portion of the passage containing head of the casing, a guide shank extending from the outer side of the piston and through the opposite head of the casing, a spring mounted in the outer chamber bearing against the piston for yieldingly urging the same to dispose the outer end of the inner shank in position to close the fluid passage, and a manually operable valve member movable to close the by-pass bore between the inlet end of the fluid passage and the inner chamber of the casing, the outer valve forming end of the inner shank being recessed at one side to form an abutment thereat for automatic opening of the shank valve when the pressure in the outlet side of the fluid passage exceeds a predetermined degree.

HOWARD V. FLANAGAN.